Dec. 2, 1969

TOSHIAKI MIYAMAE 3,481,555

FISHING REEL

Filed May 29, 1967

INVENTOR
TOSHIAKI MIYAMAE
BY
ATTORNEY.

3,481,555
FISHING REEL
Toshiaki Miyamae, 292, Nishi-Iwata, Higashi-Osaka, Osaka-fu, Japan
Filed May 29, 1967, Ser. No. 641,949
Int. Cl. A01k 89/00
U.S. Cl. 242—84.54     3 Claims

ABSTRACT OF THE DISCLOSURE

A fishing reel having a winding spool with side flanges, one flange formed as a wheel gear. A torque motor is below the spool and a pinion gear is mounted on the output shaft of the motor for rotation therewith and for slidable movement on the shaft. A spring urges the pinion gear out of engagement with the spool wheel gear and a cam is pivotally mounted adjacent the output shaft for selectively positioning the pinion gear in engagement with the wheel gear.

---

The present invention relates to an improved motorized fishing reel, in general, and a motorized fishing reel driven by a torque motor causing the reel to rotate in order to roll up or extend the fishing line, in particular.

In a conventional motorized fishing reel, the usual, conventional motors are used, the rotation speed of which remains constant all the time. Therefore, it is impossible to obtain a rotation speed which always corresponds to the changing swimming speed of a fish that has bitten the bait. Consequently, the fishing line will at times be overstrained and cut off, or unnecessarily loosened, so that the fish can easily get away, while the fishing line is often broken off, because of the sudden starting of the motor. Accordingly these problems with such reels frequently occur, since the reel cannot meet the changing load conditions.

It is one object of the motor of the present invention to completely solve the above problems of the prior fishing reels.

It is another object of the present invention to provide a fishing reel in accordance with the above-mentioned objective comprising an engaging element or wheel gear provided on the peripheral brim of one of the flanges of the line rolling spool, which is arranged between the two side plates on its right and left sides so as to be free as required. A torque motor is provided under the spool and has a shaft on which a shiftable clutch gear is arranged by means of a spring. The clutch gear is caused to engage the wheel gear, and on the outside of the clutch gear, a clutch plate 11 and clutch 10 are connected.

It is still another object of the present invention to provide a shiftable gear on the output shaft of motor, which meshes directly with a wheel gear formed on a spool, and which transmits the driving power efficiently or without any waste of power transmission.

Figure 1:
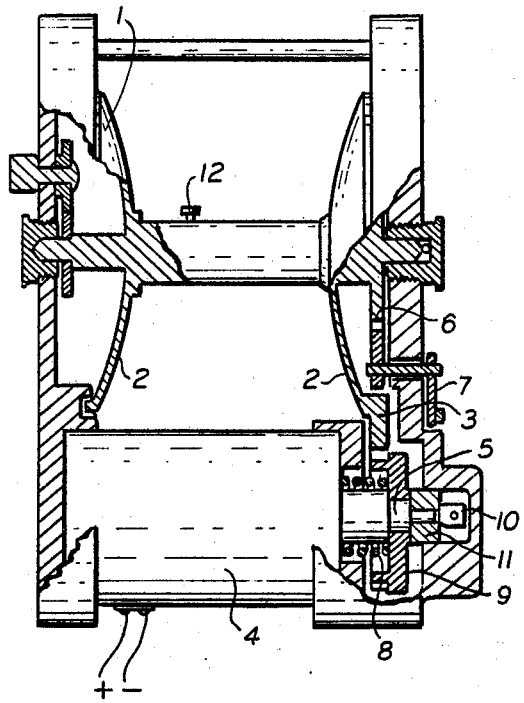
Figure 2:
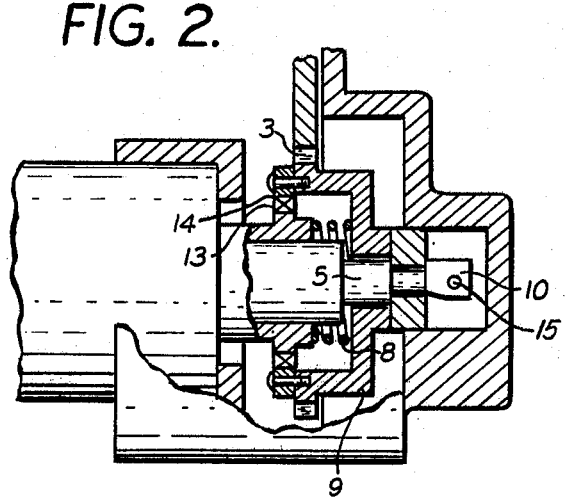

With these and other objects in view which will become apparent in the following detailed description, the present invention will be clearly understood in connection with the accompanying drawing, in which:

FIGURE 1 is a plan view partly in section of a fishing reel in accordance with the present invention; and FIG. 2 is an enlarged fragmentary view partly in section of another embodiment of the present invention.

Referring now to the drawing, and more particularly to FIG. 1, a fishing reel in accordance with the present invention comprises a fishing reel frame which rotatably supports a spool 1 having two flanges 2 on both sides of its shaft. A wheel gear 3 or engaging element is formed on the periphery of one of the flanges 2, and meshes with a pinion gear or a shiftable clutch gear 9 mounted on an output shaft 5 which extends from a motor 4 arranged under the spool 1.

On the surface of the pinion gear 9, a clutch plate or boss 11 is formed which engages with a cam 10 rotatably mounted on a shaft. Between the rear side of the pinion gear 9 and the front of the motor 4, a coil spring 8 is provided to urge the pinion gear 9 to the right. Upon turning the cam 10 about a cam pivot axis 15 with any conventional manually operative means (not shown), the pinion gear 9 is slidably pushed to the right by the repulsion of the spring 8, which gear 9 is thereby freed from engagement with the wheel gear 3. In this position, the spool 1 is free, and paying-out of the line can occur during casting or release of a hooked fish. The shaft of the spool 1 also carries a ratchet wheel or engaging lug 6 which engages a pawl secured at the end of a lever 7 which can be turned selectively by the finger or thumb so as to engage the ratchet 6 to prevent reverse rotation of the spool, or to disengage to pay out the line. The other end of the line is fixed at pin 12, and when a fish is hooked, the pinion gear 9 is pressed to the left by the cam 10 and the gear 9 meshes with the wheel gear 3 for reeling in the line.

The armature coil and the field coil are connected in series in the motor, and consequently the electric current flowing in the armature coil is equal to the current flowing in the field coil. Consequently, the squared torque and the electric current will be approximately proportional and the rotation number will be approximately proportional to the quotient obtained by dividing it by the square root of the voltage and torque. Therefore the rotation speed and power will vary according to the changing load and a very powerful torque will be generated when starting the motor. The rotation speed will automatically become slower, as the load increases, and to the contrary when the load pull decreases.

In the fishing reel according to the invention, when the cam 10 is rotated, the pinion gear 9 will disengage from connection with the wheel gear 3 due to the force of the spring 8, so that the spool 1 may be free and continue to race. The fishing line, when cast, will permit the spool to freely rotate in the reverse direction due to the gravity of the sinker. When the pinion gear 9 is moved so as to be connected again with the wheel gear 3, the spool 1 will then always be in a position to be driven by the torque motor 4. If the torque motor 4 starts to rotate when the fish is hooked on the line, the spool 1, will roll up the fishing line, and the motor 4 will automatically adjust its speed to roll up the line in accordance with the resistance of the fish, so that the line will never break since it is wound by a proper force.

On the other hand, the motor 4 may sometimes stop due to a strong pull of a fish. But, it is so constructed that it will never short circuit and, as the line is strained by the resistance of the fish, the fish is always caught.

Since the fishing reel of the present invention is constructed so as to rotate by the force of the torque motor which is transmitted to the periphery of the spool 1, the required driving force will be smaller than required with a conventional reel, where the spool rotates directly by transmitting its force to the central shaft. Consequently the motor of the present invention can be considerably small and light. As a result, the reel is especially adapted to be utilized in a fishing rod used for casting.

Furthermore, because the spool 1 and the torque motor 4 are connected through the pinion gear 9, the pinion gear 9 can be easily disengaged when casting the line, and the torque motor will automatically adjust the speed to roll up the line according to the pull of the fish, when pinion gear 9 is engaged as above-mentioned. For instance, the speed will be higher when hooking a smaller fish and vice versa, and the line will never become overstrained so as to be cut off. Additionally, the motor will never short circuit, although it may sometimes stop due to the very strong pull of the fish.

Referring now again to the drawing, and more particularly to FIG. 2, a ratchet gear 13 may be provided on the periphery of the shaft 5, and pawl 14 which can freely swing, is axially connected on one side of the pinion gear 9 in such a way that both the ratchet gear 13 and the pawl 14 can engage and disengage from each other. The gears will never be damaged since the pinion gear and the other gears will not rotate at all, since although the ratchet gear 13 and the gear 14 do not stop and the torque motor 4 rotates, its rotational power will never be transmitted to the clutch gear 9, when the cord of the motor is erroneously connected in a reverse way so as to cause the motor to rotate likewise in the reverse direction.

I claim:
1. A fishing reel comprising
 a reel frame,
 a spool rotatably mounted in said reel frame,
 a wheel gear formed on the periphery of said spool spaced from the spool axis,
 a motor means disposed in said reel frame under said spool and including a motor output shaft,
 a pinion gear slidably mounted on said motor output shaft for selective engagement and disengagement with said wheel gear,
 a spring disposed about said output shaft and urging said pinion gear to slide on said motor output shaft,
 a movable cam means operatively positioned near said pinion gear for selectively holding said pinion gear against slidable movement and releasing the latter for slidable movement by said spring, and
 means pivotally mounting said movable cam means substantially adjacent the axis of said output shaft.

2. The fishing reel, as set forth in claim 1, wherein said motor means varies its torque in relationship to the operative load on said output shaft.

3. The fishing reel, as set forth in claim 1, further comprising
 a clutch plate positioned between and against said pinion gear and said movable cam means.

References Cited

UNITED STATES PATENTS

| | | | |
|---|---|---|---|
| 1,580,986 | 4/1926 | Aberson | 243—21 |
| 2,743,067 | 4/1956 | Stratton. | |
| 3,017,134 | 1/1962 | Duvall. | |
| 3,195,829 | 7/1965 | Balaguer. | |
| 3,202,378 | 8/1965 | Williamson. | |

BILLY S. TAYLOR, Primary Examiner

U.S. Cl. X.R.

43—21; 242—84.1